(12) United States Patent
Noorkami et al.

(10) Patent No.: US 10,951,904 B2
(45) Date of Patent: Mar. 16, 2021

(54) GAZE-DRIVEN RECORDING OF VIDEO

(71) Applicant: Apple Inc., Cupertino, CA (US)

(72) Inventors: Maneli Noorkami, Sunnyvale, CA (US); Ranjit Desai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/713,778

(22) Filed: Dec. 13, 2019

(65) Prior Publication Data

US 2020/0195940 A1    Jun. 18, 2020

Related U.S. Application Data

(60) Provisional application No. 62/779,700, filed on Dec. 14, 2018.

(51) Int. Cl.
*H04N 19/23* (2014.01)
*G06F 3/01* (2006.01)
*G11B 27/02* (2006.01)

(52) U.S. Cl.
CPC ............. *H04N 19/23* (2014.11); *G06F 3/013* (2013.01); *G11B 27/02* (2013.01)

(58) Field of Classification Search
CPC .......... H04N 19/23; G06F 3/013; G11B 27/02
See application file for complete search history.

(56) References Cited

U.S. PATENT DOCUMENTS

| 8,937,591 B2 * | 1/2015 | Julian | G06F 3/04812 |
| | | | 345/156 |
| 10,375,357 B2 * | 8/2019 | Wang | H04N 7/181 |
| 10,379,612 B1 * | 8/2019 | Bonnier | G06F 3/0304 |
| 2016/0066781 A1 * | 3/2016 | Thompson | G06T 7/269 |
| | | | 600/476 |
| 2017/0201723 A1 * | 7/2017 | Kim | H04N 5/232 |
| 2017/0330042 A1 | 11/2017 | Vaziri | |
| 2017/0347039 A1 | 11/2017 | Baumert et al. | |
| 2018/0018508 A1 * | 1/2018 | Tusch | G06K 9/00771 |
| 2019/0073025 A1 * | 3/2019 | Schmidt | G06K 9/00684 |

OTHER PUBLICATIONS

Farnsworth, B., "What is Eye Tracking and How Does it Work?", https://imotions.com/blog/eye-tracking-work/, Jun. 26, 2018 (14 pp).
Invitation to Pay Additional Fees and, Where Applicable, Protest Fee in co-pending International Application No. PCT/US2019/066267 dated Mar. 13, 2020 (14 pp).

* cited by examiner

*Primary Examiner* — Mishawn N. Hunter
(74) *Attorney, Agent, or Firm* — Young Basile Hanlon & MacFarlane, P.C.

(57) ABSTRACT

Systems and methods for gaze-driven recording of video are described. Some implementations may include accessing gaze data captured using one or more gaze-tracking sensors; applying a temporal filter to the gaze data to obtain a smoothed gaze estimate; determining a region of interest based on the smoothed gaze estimate, wherein the region of interest identifies a subset of a field of view; accessing a frame of video; recording a portion of the frame associated with the region of interest as an enhanced frame of video, wherein the portion of the frame corresponds to a smaller field of view than the frame; and storing, transmitting, or displaying the enhanced frame of video.

20 Claims, 10 Drawing Sheets

700

710
APPLY COMPUTER VISION PROCESSING TO PORTION OF THE FRAME ASSOCIATED WITH THE REGION OF INTEREST TO DETECT OBJECT APPEARING IN THE PORTION OF THE FRAME AND DETERMINE A CLASSIFICATION OF THE OBJECT

720
GENERATE AN ANNOTATION BASED ON THE CLASSIFICATION

730
SUPERIMPOSE THE ANNOTATION ON THE FRAME OF VIDEO TO OBTAIN THE ENHANCED FRAME OF VIDEO

FIG. 7

GAZE-DRIVEN RECORDING OF VIDEO

CROSS-REFERENCE TO RELATED APPLICATION(S)

This application claims the benefit of U.S. Provisional Application No. 62/779,700, filed on Dec. 14, 2018. The content of the foregoing application is incorporated herein by reference in its entirety for all purposes.

TECHNICAL FIELD

This disclosure relates to gaze-driven recording of video.

BACKGROUND

Head-mounted displays are used to provide virtual reality, augmented reality, and/or mixed reality experiences for users. Video from a virtual reality or mixed reality experience may be recorded for later playback or analysis. Gaze-tracking sensors may be used to provide an indication of where a subject person is currently looking.

SUMMARY

Disclosed herein are implementations of gaze-driven recording of video.

In a first aspect, the subject matter described in this specification can be embodied in systems that include one or more gaze-tracking sensors, one or more image sensors, and a processing apparatus configured to: access gaze data captured using the one or more gaze-tracking sensors; apply a temporal filter to the gaze data to obtain a smoothed gaze estimate; determine a region of interest based on the smoothed gaze estimate, wherein the region of interest identifies a subset of a field of view of the one or more image sensors; access a frame of video captured using the one or more image sensors; and apply signal processing to the frame of video based on the region of interest to obtain an enhanced frame of video.

In a second aspect, the subject matter described in this specification can be embodied in methods that include accessing gaze data captured using one or more gaze-tracking sensors; applying a temporal filter to the gaze data to obtain a smoothed gaze estimate; determining a region of interest based on the smoothed gaze estimate, wherein the region of interest identifies a subset of a field of view; accessing a frame of video; applying signal processing to the frame of video based on the region of interest to obtain an enhanced frame of video; and storing, transmitting, or displaying the enhanced frame of video.

In a third aspect, the subject matter described in this specification can be embodied in a non-transitory computer-readable storage medium. The non-transitory computer-readable storage medium may include executable instructions that, when executed by a processor, cause performance of operations, including accessing gaze data captured using one or more gaze-tracking sensors; applying a temporal filter to the gaze data to obtain a smoothed gaze estimate; determining a region of interest based on the smoothed gaze estimate, wherein the region of interest identifies a subset of a field of view; accessing a frame of video; applying signal processing to the frame of video based on the region of interest to obtain an enhanced frame of video; and storing, transmitting, or displaying the enhanced frame of video.

In a fourth aspect, the subject matter described in this specification can be embodied in systems that include one or more gaze-tracking sensors, one or more image sensors, and a processing apparatus configured to: access gaze data captured using the one or more gaze-tracking sensors; determine a region of interest based on the gaze data, wherein the region of interest identifies a subset of a field of view of the one or more image sensors; access a frame of video captured using the one or more image sensors; and record a portion of the frame associated with the region of interest as an enhanced frame of video, wherein the portion of the frame corresponds to a smaller field of view than the frame.

In a fifth aspect, the subject matter described in this specification can be embodied in methods that include accessing gaze data captured using one or more gaze-tracking sensors; determining a region of interest based on the gaze data, wherein the region of interest identifies a subset of a field of view; accessing a frame of video; recording a portion of the frame associated with the region of interest as an enhanced frame of video, wherein the portion of the frame corresponds to a smaller field of view than the frame; and storing, transmitting, or displaying the enhanced frame of video.

In a sixth aspect, the subject matter described in this specification can be embodied in a non-transitory computer-readable storage medium. The non-transitory computer-readable storage medium may include executable instructions that, when executed by a processor, cause performance of operations, including accessing gaze data captured using one or more gaze-tracking sensors; determining a region of interest based on the gaze data, wherein the region of interest identifies a subset of a field of view; accessing a frame of video; recording a portion of the frame associated with the region of interest as an enhanced frame of video, wherein the portion of the frame corresponds to a smaller field of view than the frame; and storing, transmitting, or displaying the enhanced frame of video.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flowchart of an example of a process for annotating an image based on an object in a gaze-driven region of interest.

DETAILED DESCRIPTION

Described herein are systems and methods that provide gaze-driven signal processing to facilitate mixed reality or virtual reality applications, such as mixed reality recording. In mixed reality recording, a portion of what the user sees may be recorded. This portion of what the user sees (e.g., including frames of video presented to the user via a head-mounted display and/or frames of video of a surrounding environment that are captured using one or more image sensors mounted on a head-mounted display) may be referred to as a recording box. The recording box can be a fixed area in relation to the video input, but then the user might be looking at interesting content outside of this region that the recording will miss. Systems proposed herein identify the region of interest by tracking the user's gaze and move the recording box as the user's gaze moves. One such example can be that the gaze is in the center of the recording box to the extent that the recording box is contained in the original frame. The recording box can be a wide variety shapes, including for example, oval, hexagon, or rectangle, among others. Moving the recording box with the gaze center point can result in a jittery video. Some implementations run a smoothing or stabilization algorithm on top of gaze center points to avoid jitter in recorded video and get a more pleasant recording. This idea has use cases beyond mixed reality recording, such as running feature extraction in a region of interest; and variable bit allocation, higher in a region of interest and lower in surrounding areas.

Some implementations may provide advantages over earlier systems for recoding video, such as more efficiently focusing computing resources (e.g., memory, bandwidth, and/or processor cycles) on a portion of a video at which a user was gazing. Some implementations may enable recording of mixed reality or virtual reality experiences in a way that more efficiently represents the actual experience of the user.

Figure 1A:
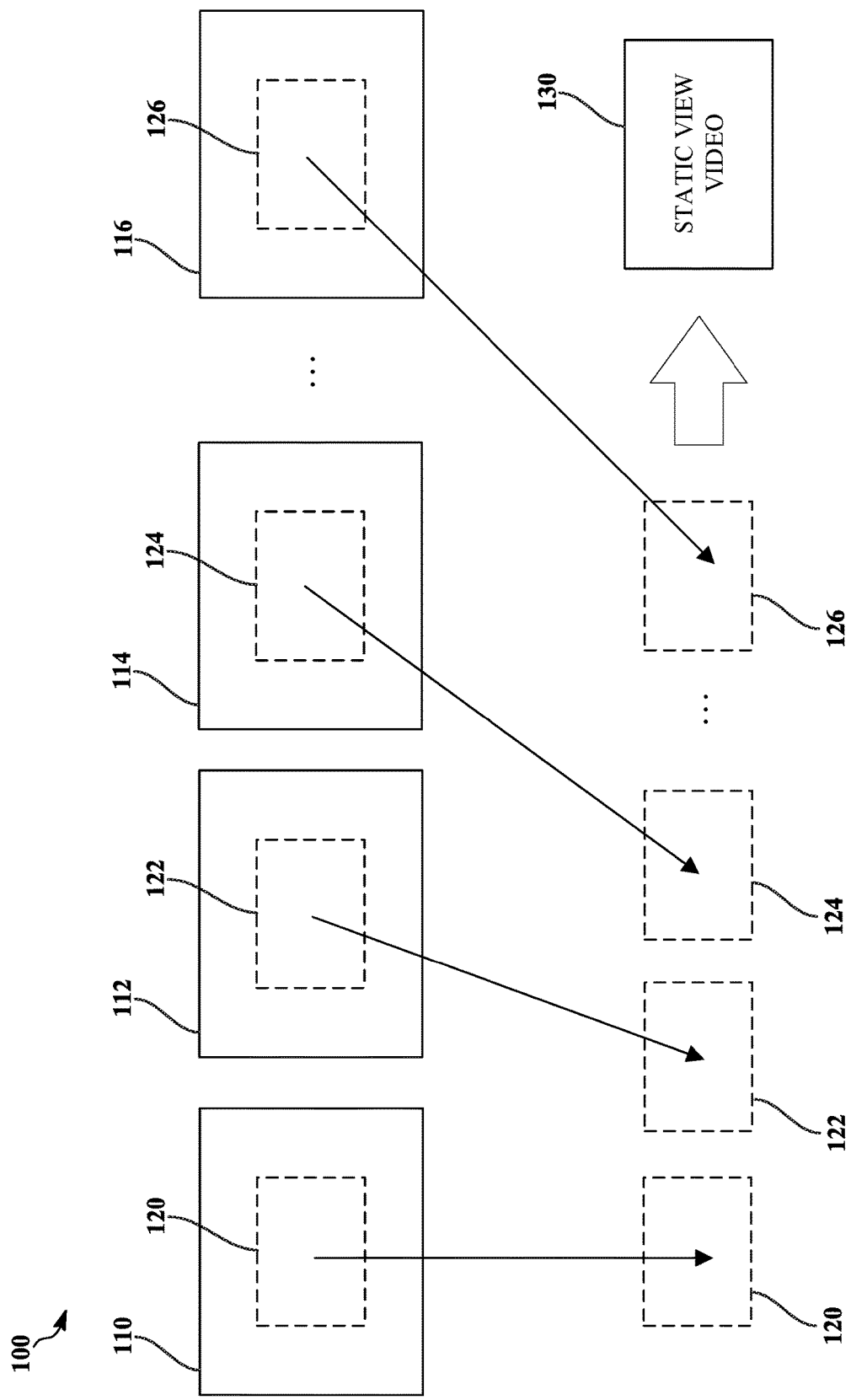
FIG. 1A is an illustration of an example of a process for recording video in mixed reality or virtual reality applications with a static region of interest.

FIG. 1A is an illustration of an example of a process 100 for recording video in mixed reality or virtual reality applications with a static region of interest. The process 100 takes a sequence of frames of video (110, 112, 114, and 116) as input and records respective portions (120, 122, 124, and 126) of the frames of video called recording boxes. For example, the frames of video (110, 112, 114, and 116) may include video data captured using one or more image sensors (e.g., including images of a physical environment near a user) and/or images of virtual objects of a virtual environment that are displayed to a user (e.g., displayed using a head-mounted display or a touchscreen display of a smartphone or tablet). In this example, the portions (120, 122, 124, and 126) of the frames of video correspond to a static region of interest, where the recording boxes are each a rectangle of pixels located at the center of the respective frames of video (110, 112, 114, and 116).

The portions (120, 122, 124, and 126) are extracted from the frames of video (110, 112, 114, and 116), and the portions (120, 122, 124, and 126) are recorded as a static view video 130. For example, the static view video 130 may be an mp4 file, and recording the static view video 130 may include passing the portions (120, 122, 124, and 126) of the frames of video as input to an encoder for compression in preparation for storage and/or transmission of the resulting static view video 130. The static view video 130 may fail to account for changes in the gaze or focus of the user during capture and/or presentation of the original frames of video (110, 112, 114, and 116), thus it may fail to accurately represent a mixed reality or virtual reality experience of the user.

Recording a fixed area may not be ideal. Interesting things that the user is looking at may occur outside of the recording box, and thus fail to be captured in the recording. Instead, the region of interest may be dynamically identified using gaze data from a gaze-tracking sensor, and the recording box may be moved as the user's gaze moves. In some implementations, the region of interest and recording box can be determined such that the gaze is in the center of the recording box to the extent that the recording box is contained in the original frame. For example, if the gaze strays to the edge of a frame of video or beyond, the recording box may be set at a nearest position on the edge of the frame, where the recording box is still full sized. The recording box can take many different shapes, such as oval, hexagon, or rectangular.

Figure 1B:
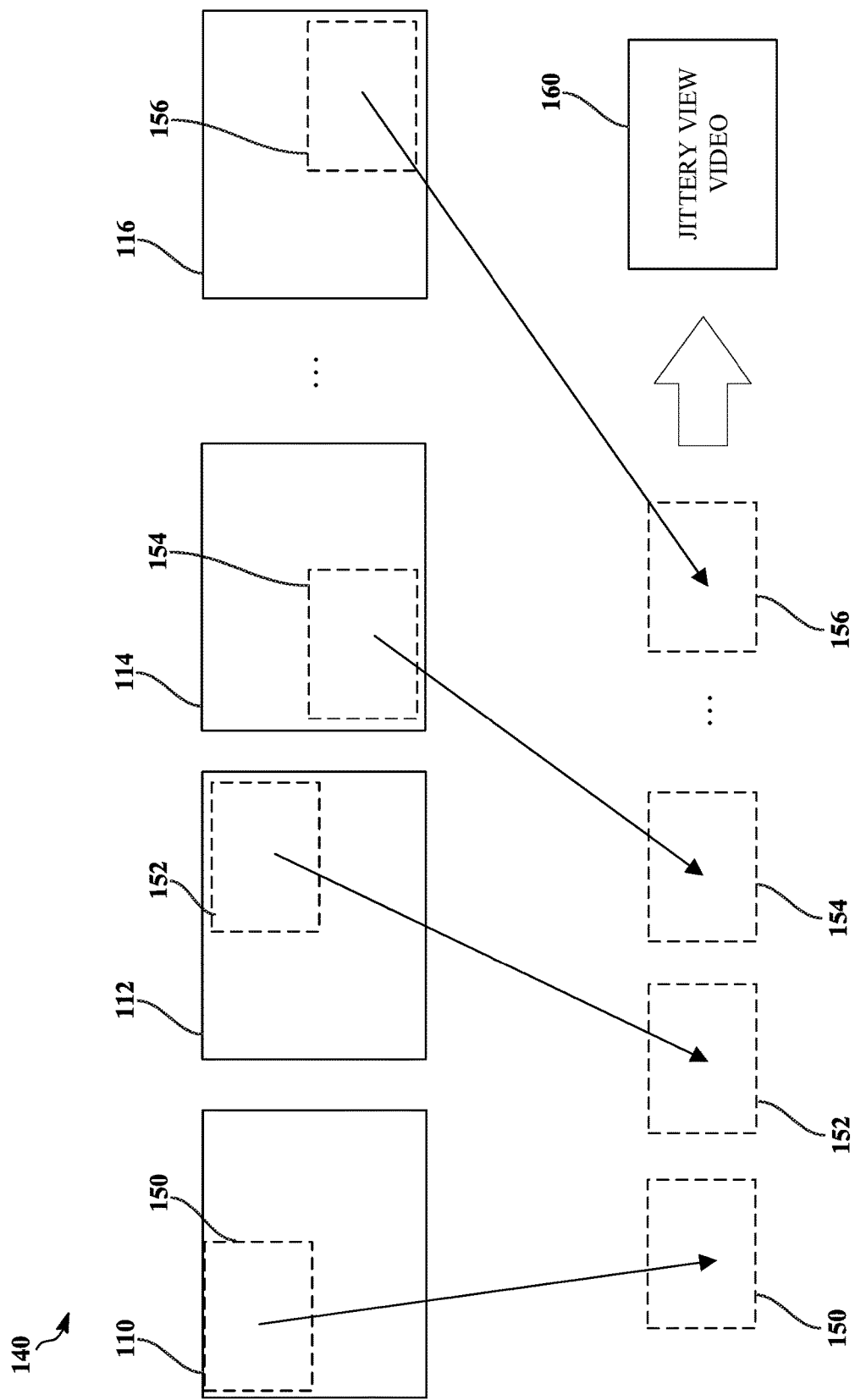
FIG. 1B is an illustration of an example of a process for recording video in mixed reality or virtual reality applications with a gaze-driven region of interest.

FIG. 1B is an illustration of an example of a process 140 for recording video in mixed reality or virtual reality applications with a gaze-driven region of interest. The process 140 takes the sequence of frames of video (110, 112, 114, and 116) as input and records respective portions (150, 152, 154, and 156) of the frames of video called recording boxes. In this example, the portions (150, 152, 154, and 156) of the frames of video correspond to the region of interest at different times, where the recording boxes are each a rectangle of pixels located with a center near a current estimate of a gaze direction of the user during capture and/or presentation of the frames of video (110, 112, 114, and 116). For example, gaze data for the user corresponding in time to frame 110 may indicate that the user was gazing in a direction corresponding to the upper left portion of the frame of video 110. Based on this gaze data, the portion 150 of the frame of video 110 may be selected for recording. For example, gaze data for the user corresponding in time to frame 112 may indicate that the user was gazing in a direction corresponding to the upper right portion of the frame 112. Based on this gaze data, the portion 152 of the frame of video 112 may be selected for recording. For example, gaze data for the user corresponding in time to frame 114 may indicate that the user was gazing in a direction corresponding to the lower left portion of the frame 114. Based on this gaze data, the portion 154 of the frame of video 114 may be selected for recording. For example, gaze data for the user corresponding in time to frame 116 may indicate that the user was gazing in a direction corresponding to the lower right portion of the frame 116. Based on this gaze data, the portion 156 of the frame of video 116 may be selected for recording. Thus, the region of interest determined based on the gaze data, and the corresponding portions or recording boxes, may jump around considerably between adjacent frames in the sequence of frames of video (110, 112, 114, and 116), which may result in a jittery recording the mixed reality or virtual reality experience of the user.

The portions (150, 152, 154, and 156) are extracted from the frames of video (110, 112, 114, and 116), and the portions (150, 152, 154, and 156) are recorded as a jittery view video 160. For example, the jittery view video 160 may be an mp4 file, and recording the jittery view video 160 may include passing the portions (150, 152, 154, and 156) of the frames of video as input to an encoder for compression in preparation for storage, transmission and/or display of the resulting jittery view video 160. The jittery view video 160 may account for changes in the gaze or focus of the user during capture and/or presentation of the original frames of video (110, 112, 114, and 116), but it may be unpleasant to view due to jitter caused by fine rapid eye movements of the user about a scene and/or noise in gaze data for the user.

For example, the process 140 may include accessing gaze data captured using one or more gaze-tracking sensors, and determining a region of interest based on the gaze data. The region of interest may identify a subset of a field of view. For example, the process 140 may include accessing a frame of video and recording a portion of the frame associated with the region of interest as an enhanced frame of video, wherein the portion of the frame corresponds to a smaller field of view than the frame. For example, the process 140 may include storing, transmitting, or displaying the enhanced frame of video.

In some implementations, a smoothing or stabilization algorithm may be run to process a sequence of gaze center points from the gaze data to avoid jitter in recorded video and thereby obtain a more pleasant recording.

Figure 1C:
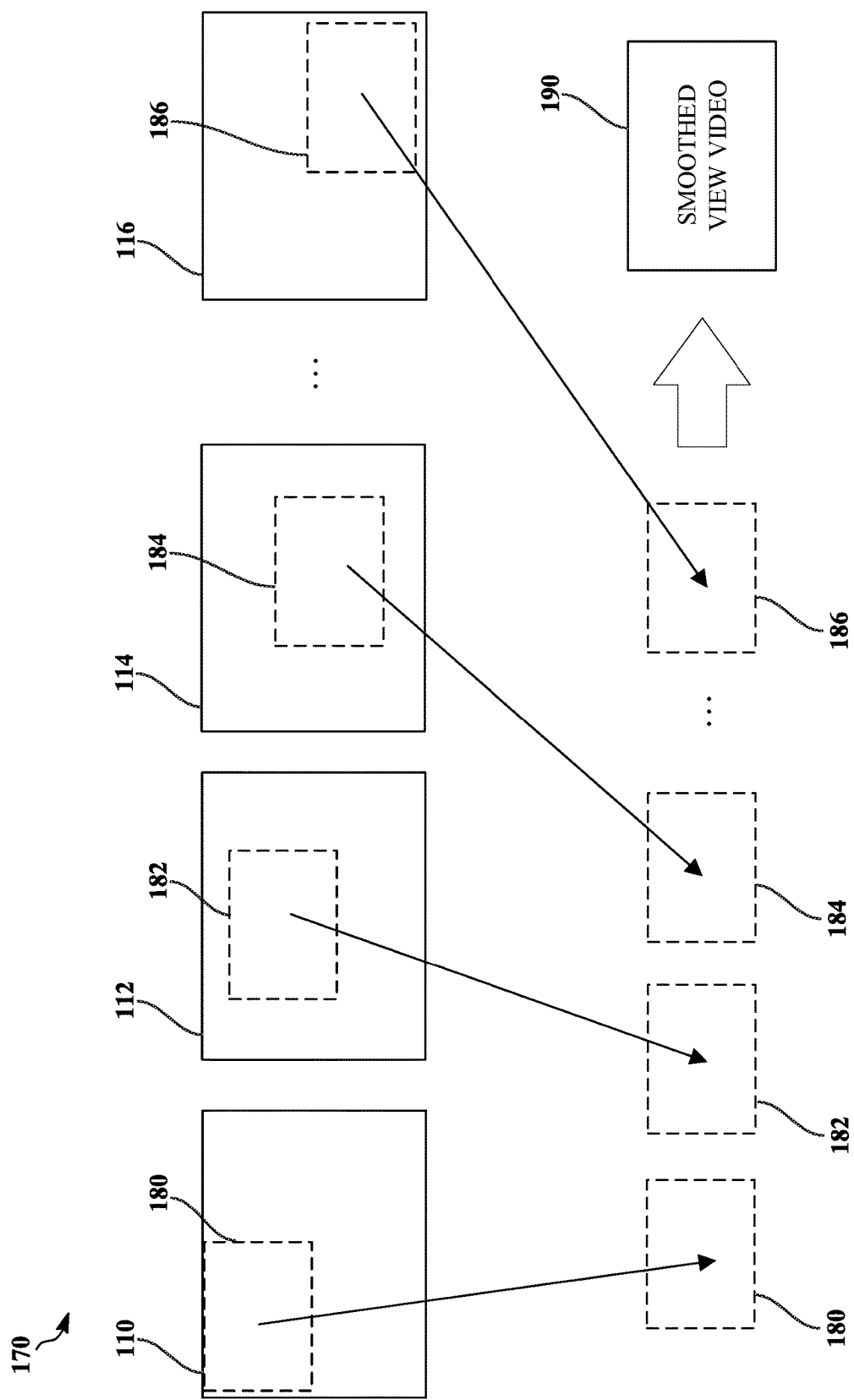
FIG. 1C is an illustration of an example of a process for recording video in mixed reality or virtual reality applications with a smoothed gaze-driven region of interest.

FIG. 1C is an illustration of an example of a process 170 for recording video in mixed reality or virtual reality applications with a smoothed gaze-driven region of interest. The process 170 takes the sequence of frames of video (110, 112, 114, and 116) as input and records respective portions (180, 182, 184, and 186) of the frames of video called recording boxes. In this example, the portions (180, 182, 184, and 186) of the frames of video correspond to the region of interest at different times, where the recording boxes are each a rectangle of pixels located with a center near a smoothed estimate of a gaze direction of the user during capture and/or presentation of the frames of video (110, 112, 114, and 116). For example, a smoothed gaze estimate for the user corresponding in time to frame 110 may indicate that the user was gazing in a direction corresponding to the upper left portion of the frame 110. Based on this smoothed gaze estimate, the portion 180 of the frame of video 110 may be selected for recording. For example, the smoothed gaze estimate for the user corresponding in time to frame 112 may indicate that the user was gazing in a direction corresponding to a portion 182 that is slightly above and to the left of the center of the frame 112, which may be an interpolation of gaze positions from the gaze data for a window of times close to the time of the frame 112. Based on this smoothed gaze estimate, the portion 182 of the frame of video 112 may be selected for recording. For example, the smoothed gaze estimate for the user corresponding in time to frame 114 may indicate that the user was gazing in a direction corresponding to a portion 184 that is slightly below and to the right of the center of the frame 114, which may be an interpolation of gaze positions from the gaze data for a window of times close to the time of the frame 114. Based on this smoothed gaze estimate, the portion 184 of the frame of video 114 may be selected for recording. For example, the smoothed gaze estimate for the user corresponding in time to frame 116 may indicate that the user was gazing in a direction corresponding to the lower right portion of the frame 116, which may be an interpolation of gaze positions from the gaze data for a window of times close to the time of the frame 116. Based on this smoothed gaze estimate, the portion 186 of the frame of video 116 may be selected for recording. Thus, the region of interest determined based on the smoothed gaze estimate, and the corresponding sequence of portions or recording boxes, may smoothly transition between different areas of frames of video (110, 112, 114, and 116) corresponding to extended periods of attention by the user's gaze. This smoothed evolution of the region of interest may result in a smooth recording of the mixed reality or virtual reality experience of the user.

The portions (180, 182, 184, and 186) are extracted from the frames of video (110, 112, 114, and 116), and the portions (180, 182, 184, and 186) are recorded as a smoothed view video 190. For example, the smoothed view video 190 may be an mp4 file, and recording the smoothed view video 190 may include passing the portions (180, 182, 184, and 186) of the frames of video as input to an encoder for compression in preparation for storage and/or transmission of the resulting smoothed view video 190. The smoothed view video 190 may account for changes in the gaze or focus of the user during capture and/or presentation of the original frames of video (110, 112, 114, and 116), while suppressing noise in the gaze data and providing a useful representation of the mixed reality or virtual reality experience of the user.

Figure 2:
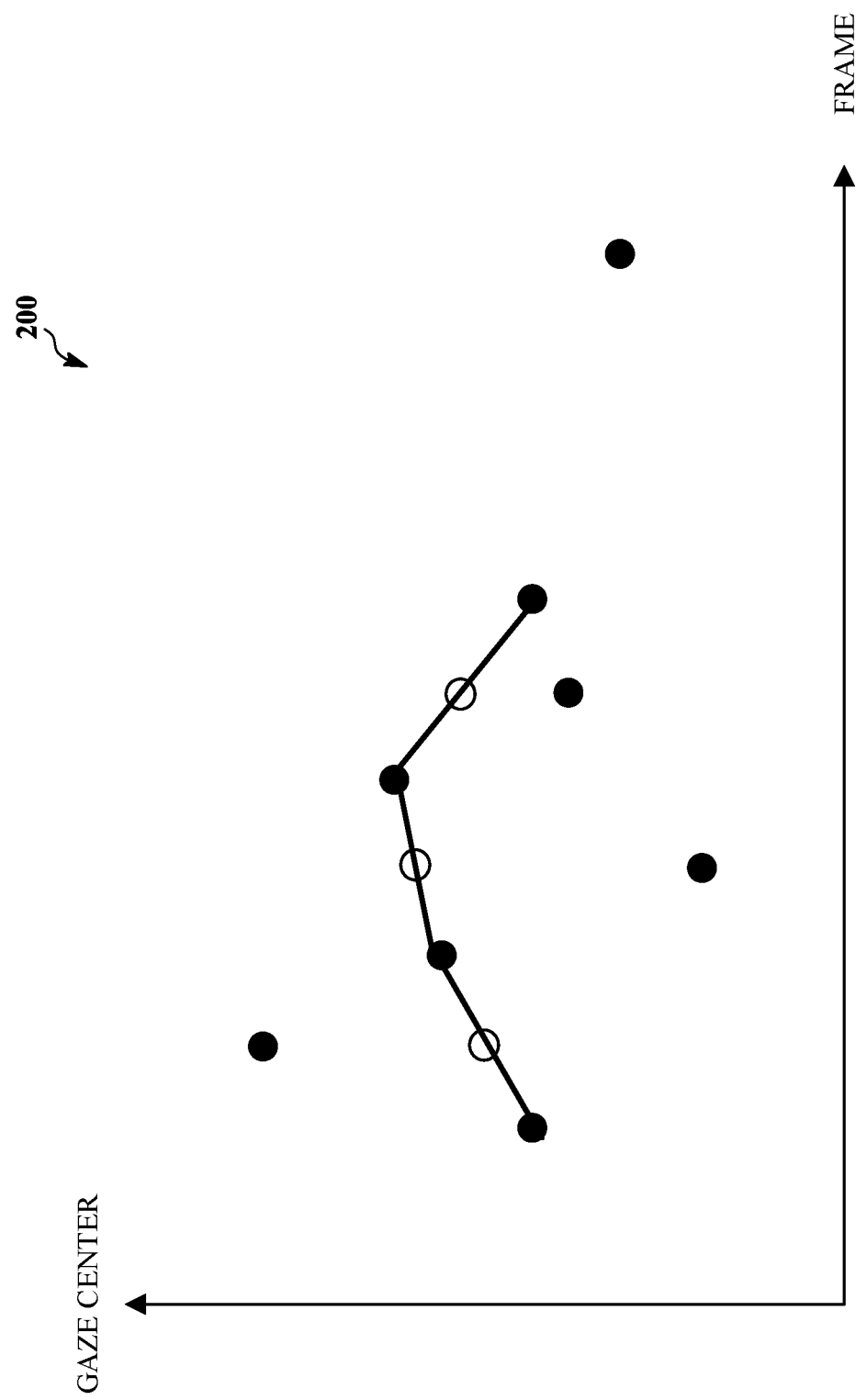
FIG. 2 is a plot of an example of gaze data used to drive recording of video in a mixed reality or virtual reality application.

FIG. 2 is a plot of an example of gaze data 200 used to drive recording of video in a mixed reality or virtual reality application. The gaze data is plotted with gaze center versus frame number to show an evolution of the measured gaze during a mixed reality or virtual reality experience. For simplicity, the gaze centers are represented as one-dimensional (e.g., a horizontal offset or a vertical offset of the detected gaze of the user during the capture and/or presentation of the input video), although the gaze center can evolve and usually does evolve in two dimensions. The solid black dots represent the gaze center data points from a gaze-tracking sensor with a gaze tracking algorithm. The hollow circle points represent interpolated gaze positions that have been determined using temporal filtering to interpolate nearby data points in time to determine a smoothed gaze estimate. FIG. 2 shows linear interpolation of gaze data, but other types of interpolation can be used. The interpolated gaze positions may be used as smoothed gaze estimates for frames when the corresponding gaze data for the frame is too far from the data for nearby times or frames. The curve drawn on the plot illustrates an example of a sequence of gaze center estimates that could be used for identification of the evolving region of interest, which may be used for recording a mixed reality or virtual reality experience of the user.

Figure 3:
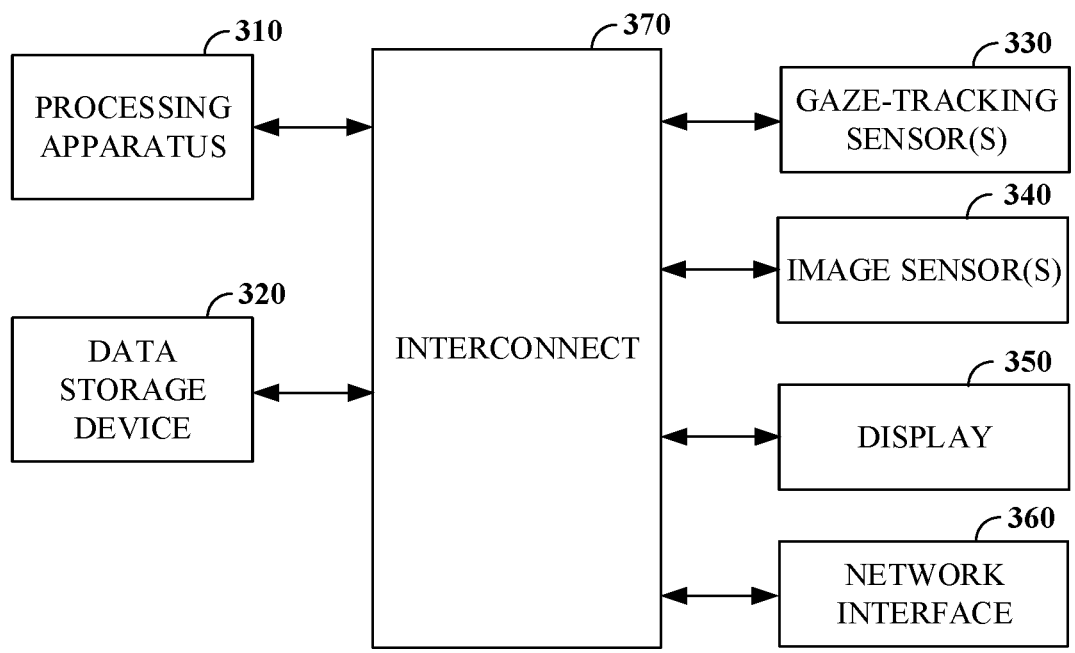
FIG. 3 is a block diagram of an example of a mobile computing device configured to enable gaze-driven processing of video.

FIG. 3 is a block diagram of an example of a mobile computing device 300 configured to enable gaze-driven signal processing to facilitate mixed reality or virtual reality applications, such as mixed reality recording. The mobile computing device 300 includes a processing apparatus 310, a data storage device 320, one or more gaze-tracking sensors 330, one or more image sensors 340, a display 350, a network interface 360, and an interconnect 370 through which the processing apparatus 310 may access the other components. The mobile computing device 300 may be configured to determine a region of interest for a user based on gaze data for the user, and perform signal processing to enhance a portion of video corresponding to the region of interest. For example, the mobile computing device 300 may be configured to implement the process 600 of FIG. 6. For example, the mobile computing device 300 may be configured to implement the process 700 of FIG. 7. For example, the mobile computing device 300 may be configured to implement the process 800 of FIG. 8.

The processing apparatus 310 may be operable to execute instructions that have been stored in a data storage device 320. In some implementations, the processing apparatus 310 is a processor with random access memory for temporarily storing instructions read from the data storage device 320 while the instructions are being executed. The processing apparatus 310 may include single or multiple processors, each having single or multiple processing cores. Alternatively, the processing apparatus 310 may include another type of device, or multiple devices, capable of manipulating or processing data. For example, the data storage device 320 may be a non-volatile information storage device such as a hard drive, a solid-state drive, a read-only memory device (ROM), an optical disc, a magnetic disc, or any other suitable type of storage device such as a non-transitory computer-readable memory. The data storage device 320 may include another type of device, or multiple devices, capable of storing data for retrieval or processing by the processing apparatus 310. The processing apparatus 310 may access and manipulate data stored in the data storage device 320 via the interconnect 370. For example, the data storage device 320 may store instructions executable by the processing apparatus 310 that upon execution by the processing apparatus 310 cause the processing apparatus 310 to perform operations (e.g., operations that implement the process 600 of FIG. 6). In some implementations, the processing apparatus 310 and the data storage device 320 are attached to the display 350.

The one or more gaze-tracking sensors 330 may be configured to detect the gaze of a user's eyes. For example, the one or more gaze-tracking sensors 330 may include one or more image sensors, which may detect light in various spectra (e.g., an infrared spectrum or a visible spectrum), and/or light sources (e.g., an infrared light source that is shined at the eyes of the user). For example, the one or more gaze-tracking sensors 330 may also include hardware and/or software (e.g., gaze-tracking software) for processing raw image data with a gaze tracking algorithm to generate gaze data, including a sequence of gaze points that each specify a direction or focal point of a current gaze of an observed user. In some implementations, the one or more gaze-tracking sensors 330 are coupled (e.g., attached) to the display 350 (e.g., a head-mounted display or a touchscreen display of a tablet or smartphone). For example, the one or more gaze-tracking sensors 330 may be mounted on a fastening article (e.g., eyeglass frames or goggles) of a head-mounted display in such a way as to be directed at the eyes of a user wearing the head-mounted display. For example, the one or more gaze-tracking sensors 330 may include a front-facing camera of a tablet or smartphone that is mounted in such a way as to be directed at the eyes of a user who is holding the device and viewing its touchscreen display. In some implementations, a user's gaze direction in the coordinates of an attached image sensor or display may be determined based on gaze data from the one or more gaze-tracking sensors 330.

The one or more image sensors 340 may be configured to capture images, converting light incident on the one or more image sensors 340 into one or more digital images. In some implementations, the one or more image sensors 340 are coupled (e.g., attached) to the display 350 (e.g., a head-mounted display). The one or more image sensors 340 may detect light of a certain spectrum (e.g., a visible spectrum and/or an infrared spectrum) and convey information constituting an image as electrical signals (e.g., analog or digital signals). For example, the one or more image sensors 340 may include an array of sensing elements each operable to output a signal representing incident light as an image having an array of pixels representing a captured scene (e.g., defining a picture of a real-world environment where the image sensor is located). For example, the one or more image sensors 340 may include charge-coupled devices (CCDs) or active pixel sensors in a complementary metal-oxide-semiconductor (CMOS). In some implementations, the one or more image sensors 340 include an analog-to-digital converter. For example, the one or more image sensors 340 may include an infrared camera and a visible light camera. The one or more image sensors 340 may include an image sensor configured to capture images of a vicinity of the mobile computing device 300. In some implementations, the one or more image sensors 340 include an array of image sensors arranged around a device (e.g., the head-mounted display 410) to provide a collective field of view spanning a wide angle. For example, the one or more image sensors 340 may be arranged to provide a panoramic view (e.g., a 360 degree panoramic view) of an area around a head-mounted display. For example, the one or more image sensors 340 may receive light through respective lenses (e.g., a fisheye lens or a rectilinear lens).

The display 350 includes a screen, a lens, or another type of optical assembly configured to direct light to the eyes of a user to enable the presentation of images (e.g., video frames) to the user. For example, the display 350 may include a touchscreen display, where the mobile computing device 300 is a smartphone or tablet. In some implementations, the display 350 includes a head-mounted display (e.g., smart glasses), which may be held in place on a face of the user by a fastening article (e.g., a headband or a frame). In some implementations, a screen of the display 350 is positioned directly in front of eyes of the user. In some implementations, the display 350 includes an optical assembly (e.g., a lens and/or a mirror) that is positioned directly in front of eyes of the user and configured to direct light from a screen or projector of the display 350 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also permit light from an environment in front of the user to pass through the lens to reach eyes of the user and allow the user to see in front of him or her while having objects of a virtual environment depicted in an image presented by the display 350 overlaid on a view of the physical environment in front of the user.

The network interface 360 facilitates communication with other devices, such a cloud server. For example, the network interface 360 may facilitate communication via a communications network. For example, the network interface 360 may facilitate communication via a Wi-Fi network, a cellular network, and/or a wired network. For example, the network interface 360 may facilitate communication via a WiMAX network. For example, the network interface 360 may facilitate communication via a fiber optic network.

For example, the interconnect 370 may be a system bus, or a wired or wireless network (e.g., a body area network).

The processing apparatus 310 may be configured to enable gaze-driven signal processing to facilitate mixed reality or virtual reality applications, such as mixed reality recording. For example, the processing apparatus 310 may be configured to access gaze data captured using the one or more gaze-tracking sensors 330, apply a temporal filter to the gaze data to obtain a smoothed gaze estimate, and determine a region of interest based on the smoothed gaze estimate. For example, the region of interest may identify a subset of a field of view of the one or more image sensors 340. For example, the processing apparatus 310 may be configured to access a frame of video captured using the one or more image sensors 340, and apply signal processing to the frame of video based on the region of interest to obtain an enhanced frame of video. For example, the processing apparatus 310 may be configured to record a portion of the frame associated with the region of interest as the enhanced frame of video. For example, the portion of the frame may correspond to a smaller field of view than the frame. For example, the processing apparatus 310 may be configured to encode the frame using a first bit per pixel allocation for a first portion of the frame associated with the region of interest, and using one or more bit per pixel allocations that are lower than the first bit per pixel allocation for one or more respective portions of the frame outside of the first portion of the frame. For example, the processing apparatus 310 may be configured to apply computer vision processing to a portion of the frame associated with the region of interest to detect an object appearing in the portion of the frame and determine a classification of the object. For example, the portion of the frame may correspond to a smaller field of view than the frame. For example, the processing apparatus 310 may be configured to generate an annotation based on the classification, and superimpose the annotation on the frame of video to obtain the enhanced frame of video. For example, the display 350 may include a head-mounted display attached to the one or more gaze-tracking sensors 330 and the one or more image sensors 340. For example, the head-mounted display may be configured to display the enhanced frame of video. In some implementations, the temporal filter includes a Kalman filter. In some implementations, the temporal filter includes a moving average of the gaze data in a window of time. For example, the processing apparatus 310 may be configured to apply the temporal filter to the gaze data to obtain the smoothed gaze estimate by fitting a curve to the gaze data in a window of time. For example, the processing apparatus 310 may be configured to determine the region of interest based on the smoothed gaze estimate by applying computer vision processing to the frame of video to detect and classify an object appearing in the frame of video to obtain a location within the frame of video associated with the object; determining values of a cost function for the region of interest based on the smoothed gaze estimate and the location of the object; and determining the region of interest based on the values of the cost function.

Figure 4:
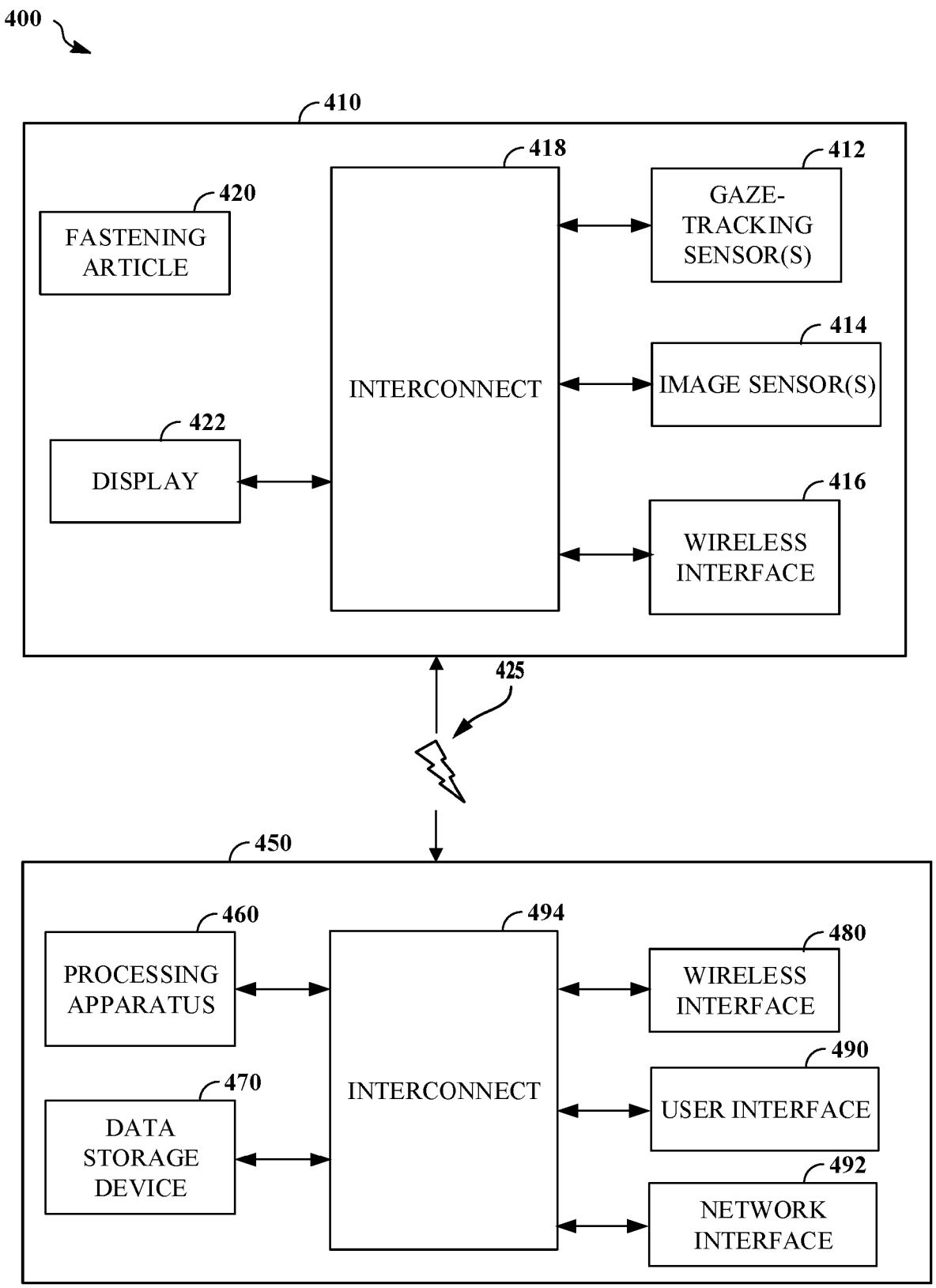
FIG. 4 is a block diagram of an example of a system configured to enable gaze-driven processing of video.

FIG. 4 is a block diagram of an example of a system 400 configured to enable gaze-driven signal processing to facilitate mixed reality or virtual reality applications, such as mixed reality recording. The system 400 includes a head-mounted display 410 and a computing device 450 that communicate via wireless communications link 425. The head-mounted display 410 includes one or more gaze-tracking sensors 412, one or more image sensors 414, a wireless communications interface 416, a display 422, an interconnect 418 through which components of the head-mounted display may exchange information (e.g., under the control of a microcontroller or other processing apparatus in the head-mounted display 410 that is not shown in FIG. 4), and a fastening article 420 configured to hold the head-mounted display 410 in place on a head of a user that is wearing the head-mounted display 410. The computing device 450 includes a processing apparatus 460, a data storage device 470, a wireless communications interface 480, a user interface 490, a network interface 492, and an interconnect 494 through which the processing apparatus 460 may access the other components of the computing device 450. The computing device 450 may be positioned near a user wearing the head-mounted display 410 and may perform computational tasks to control the head-mounted display 410. For example, the computing device 450 may be a smartphone, a tablet, a laptop, a desktop computer, or an appliance (e.g., a smart television or a smart speaker) on a table located in a room with the user, or the computing device 450 may be another wearable device worn at a different body part of the user (e.g., the computing device 450 may be integrated with a vest worn on a chest). The system 400 may be configured to determine a region of interest for a user based on gaze data for the user, and perform signal processing to enhance a portion of video corresponding to the region of interest. For example, the system 400 may be configured to implement the process 600 of FIG. 6. For example, the system 400 may be configured to implement the process 700 of FIG. 7. For example, the system 400 may be configured to implement the process 800 of FIG. 8.

The one or more gaze-tracking sensors 412 may be configured to detect the gaze of a user's eyes. For example, the one or more gaze-tracking sensors 412 may include one or more image sensors, which may detect light in various spectra (e.g., an infrared spectrum or a visible spectrum), and/or light sources (e.g., an infrared light source that is shined at the eyes of the user). For example, the one or more gaze-tracking sensors 412 may also include hardware and/or software (e.g., gaze-tracking software) for processing raw image data with a gaze tracking algorithm to generate gaze data, including a sequence of gaze points that each specify a direction or focal point of a current gaze of an observed user. In some implementations, the one or more gaze-tracking sensors 412 are coupled (e.g., attached) to the display 422. For example, the one or more gaze-tracking sensors 412 may be mounted on the fastening article 420 (e.g., eyeglass frames or goggles) of the head-mounted display 410 in such a way as to be directed at the eyes of a user wearing the head-mounted display 410. In some implementations, a user's gaze direction in the coordinates of an attached image sensor or display may be determined based on gaze data from the one or more gaze-tracking sensors 412.

The head-mounted display 410 includes one or more image sensors 414. The one or more image sensors 414 may be configured to capture images, converting light incident on the one or more image sensors 414 into one or more digital images. The one or more image sensors 414 are coupled (e.g., attached) to the head-mounted display 410. The one or more image sensors 414 may detect light of a certain spectrum (e.g., a visible spectrum and/or an infrared spectrum) and convey information constituting an image as electrical signals (e.g., analog or digital signals). For example, the one or more image sensors 414 may include charge-coupled devices (CCDs) or active pixel sensors in a complementary metal-oxide-semiconductor (CMOS). In some implementations, the one or more image sensors 414 include an analog-to-digital converter. For example, the one or more image sensors 414 may include an array of sensing elements each operable to output a signal representing incident light as an image having an array of pixels representing a captured scene (e.g., defining a picture of a real-world environment where the image sensor is located). For example, the one or more image sensors 414 may include an infrared camera and a visible light camera. The one or more image sensors 414 may include an image sensor configured to capture images of a vicinity of the head-mounted display 410. In some implementations, the one or more image sensors 414 include an array of image sensors arranged around the head-mounted display 410 to provide a collective field of view spanning a wide angle. For example, the one or more image sensors 414 may be arranged to provide a panoramic view (e.g., a 360 degree panoramic view) of an area around the head-mounted display 410. For example, the one or more image sensors 414 may receive light through respective lenses (e.g., a fisheye lens or a rectilinear lens).

The head-mounted display 410 includes a wireless communications interface 416. The wireless communications interface 416 facilitates communication with other devices, including the computing device 450. For example, the wireless communications interface 416 may facilitate communication via a Wi-Fi network, a Bluetooth link, or a ZigBee link. In some implementations, the wireless communications interface 416 may be used to receive, from the computing device 450, data and/or instructions invoking presentation using the display 422 of a view of a virtual environment. In some implementations, the wireless communications interface 416 may be used to transmit sensor data from the one or more gaze-tracking sensors 412 and/or images captured using the one or more image sensors 414 to the computing device 450.

The head-mounted display 410 includes a display 422. The display 422 may be configured to present images, converting digital images into light projected from the display 422. The display 422 may project light using an array of pixels that project light in a visible spectrum. The display 422 may include a screen, a lens, or another type of optical assembly configured to direct light to the eyes of a user wearing the head-mounted display 410 to enable the presentation of images (e.g., video frames) to the user. For example, the display 422 may include a screen, such as a liquid crystal display (LCD), a light emitting diode (LED) display (e.g., an OLED display), or other suitable screen. For example, the display 422 may include a projector. In some implementations, a screen of the display 422 is positioned directly in front of eyes of the user. In some implementations, the display 422 includes an optical assembly (e.g., a lens and/or a mirror) that is positioned directly in front of eyes of the user and configured to direct light from a screen or projector of the display 422 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also permit light from a physical environment in front of the user to pass through the lens to reach eyes of the user and allow the user to see in front of him or her while having objects of a virtual environment depicted in an image presented by the display 422 overlaid on a view of the physical environment in front of the user. In some implementations, a transparency of the optical assembly (e.g., a lens) may be adjusted to suit a mixed reality application (e.g., a virtual reality application or an augmented reality application).

For example, the interconnect 418 may be a system bus, or a wired or wireless network (e.g., a body area network).

The head-mounted display 410 includes a fastening article 420. The fastening article 420 may be configured to hold the head-mounted display 410 in place on a head of a user when the user is wearing the head-mounted display 410. For example, the fastening article 420 may include a headband. For example, the fastening article 420 may include a frame with arms that rest on ears of the user and hold a lens or a screen of the display 422 in front of an eye of the user.

The computing device 450 includes a processing apparatus 460. The processing apparatus 460 may be operable to execute instructions that have been stored in a data storage device 470. In some implementations, the processing apparatus 460 is a processor with random access memory for temporarily storing instructions read from the data storage device 470 while the instructions are being executed. The processing apparatus 460 may include single or multiple processors, each having single or multiple processing cores. Alternatively, the processing apparatus 460 may include another type of device, or multiple devices, capable of manipulating or processing data. For example, the data storage device 470 may be a non-volatile information storage device such as a hard drive, a solid-state drive, a read-only memory device (ROM), an optical disc, a magnetic disc, or any other suitable type of storage device such as a non-transitory computer-readable memory. The data storage device 470 may include another type of device, or multiple devices, capable of storing data for retrieval or processing by the processing apparatus 460. The processing apparatus 460 may access and manipulate data stored in the data storage device 470 via the interconnect 494. For example, the data storage device 470 may store instructions executable by the processing apparatus 460 that upon execution by the processing apparatus 460 cause the processing apparatus 460 to perform operations (e.g., operations that implement the process 600 of FIG. 6).

The computing device 450 includes a wireless communications interface 480. The wireless communications interface 480 facilitates communication with other devices, including the head-mounted display 410. For example, the wireless communications interface 480 may facilitate communication via a Wi-Fi network, a Bluetooth link, or a ZigBee link. The wireless communications interface 480 may be used to establish the wireless communications link 425 with the head-mounted display 410. In some implementations, the wireless communications interface 480 may be used to receive sensor data (e.g., motion sensor data and/or images) from the head-mounted display 410. In some implementations, the wireless communications interface 480 may be used to transmit, to the head-mounted display 410, data and/or instructions invoking presentation using the display 422 of a view of a virtual environment.

In the example of FIG. 4, the computing device 450 includes a user interface 490. For example, the user interface 490 may include a touchscreen display. For example, the user interface 490 may include a microphone configured to receive speech commands. For example, the user interface 490 may include an image sensor configured to detect hand gesture commands. For example, the user interface 490 may include a keyboard, a mouse, a joystick, and/or another handheld controller. For example, the user interface 490 may enable a user (e.g., the user wearing the head-mounted display 410) to enter commands to an augmented reality application running on the computing device 450 and/or to change the configuration of a process associated with an object of a virtual environment of the augmented reality application.

The computing device 450 includes a network interface 492. The network interface 492 facilitates communication with other devices, such as a cloud server. For example, the network interface 492 may facilitate communication via a communications network. For example, the network interface 492 may facilitate communication via a Wi-Fi network, a cellular network and/or a wired network. For example, the network interface 492 may facilitate communication via a WiMAX network. For example, the network interface 492 may facilitate communication via a fiber optic network.

For example, the interconnect 494 may be a system bus, or a wired or wireless network (e.g., a body area network).

The processing apparatus 460 may be configured to enable gaze-driven signal processing to facilitate mixed reality or virtual reality applications, such as mixed reality recording. For example, the processing apparatus 460 may be configured to access gaze data captured using the one or more gaze-tracking sensors 412, apply a temporal filter to the gaze data to obtain a smoothed gaze estimate, and determine a region of interest based on the smoothed gaze estimate. For example, the region of interest may identify a subset of a field of view of the one or more image sensors 414. For example, the processing apparatus 460 may be configured to access a frame of video captured using the one or more image sensors 414, and apply signal processing to the frame of video based on the region of interest to obtain an enhanced frame of video. For example, the processing apparatus 460 may be configured to record a portion of the frame associated with the region of interest as the enhanced frame of video. For example, the portion of the frame may correspond to a smaller field of view than the frame. For example, the processing apparatus 460 may be configured to encode the frame using a first bit per pixel allocation for a first portion of the frame associated with the region of interest, and using one or more bit per pixel allocations that are lower than the first bit per pixel allocation for one or more respective portions of the frame outside of the first portion of the frame. For example, the processing apparatus 460 may be configured to apply computer vision processing to a portion of the frame associated with the region of interest to detect an object appearing in the portion of the frame and determine a classification of the object. For example, the portion of the frame may correspond to a smaller field of view than the frame. For example, the processing apparatus 460 may be configured to generate an annotation based on the classification, and superimpose the annotation on the frame of video to obtain the enhanced frame of video. For example, the head-mounted display 410 may be configured to display the enhanced frame of video. In some implementations, the temporal filter includes a Kalman filter. In some implementations, the temporal filter includes a moving average of the gaze data in a window of time. For example, the processing apparatus 460 may be configured to apply the temporal filter to the gaze data to obtain the smoothed gaze estimate by fitting a curve to the gaze data in a window of time. For example, the processing apparatus 460 may be configured to determine the region of interest based on the smoothed gaze estimate by applying computer vision processing to the frame of video to detect and classify an object appearing in the frame of video to obtain a location within the frame of video associated with the object; determining values of a cost function for the region of interest based on the smoothed gaze estimate and the location of the object; and determining the region of interest based on the values of the cost function.

In some implementations (not shown in FIG. 4), processing for a mixed reality or virtual reality application may be distributed between a processing apparatus in the head-mounted display 410 and the processing apparatus 460. For example, a simulation process may be run on a processing apparatus of the head-mounted display 410 to reduce latency for updates to the view of the virtual environment, while one or more processes associated with objects in the virtual environment may be run on the processing apparatus 460 to update the states of the objects. In some implementations, reality fragments may be transmitted via the wireless communications link 425 between the head-mounted display 410 and the computing device 450. Thus, the processing apparatus of the head-mounted display 410 and the processing apparatus 460 may operate as a single processing apparatus distributed between the head-mounted display 410 and the computing device 450 that runs a mixed reality or virtual reality application and implements processes described herein (e.g., the process 600 of FIG. 6).

Figure 5:
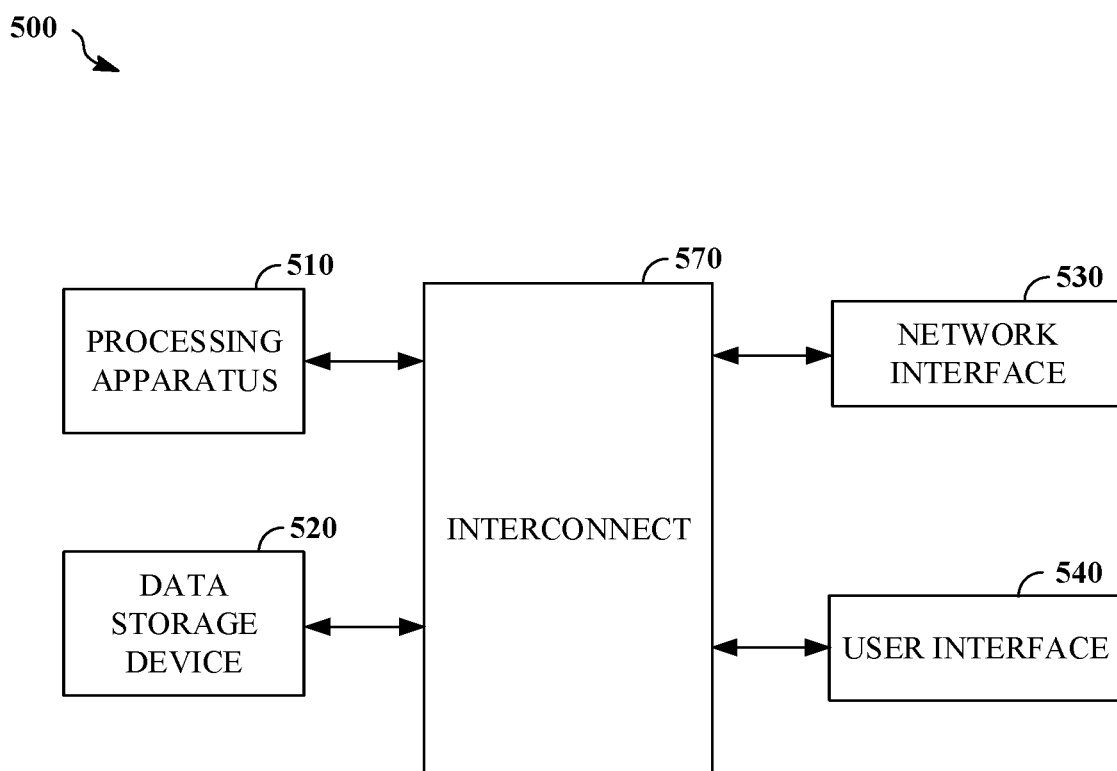
FIG. 5 is a block diagram of an example of a cloud server configured to enable gaze-driven processing of video.

FIG. 5 is a block diagram of an example of a cloud server 500 configured to enable gaze-driven signal processing to facilitate mixed reality or virtual reality applications, such as mixed reality recording. The cloud server 500 includes a processing apparatus 510, a data storage device 520, a network interface 530, a user interface 540, and an interconnect 570 through which the processing apparatus 510 may access the other components. The cloud server 500 may be configured to determine a region of interest for a user based on gaze data for the user, and perform signal processing to enhance a portion of video corresponding to the region of interest. For example, the cloud server 500 may be configured to implement the process 600 of FIG. 6.

The processing apparatus 510 may be operable to execute instructions that have been stored in a data storage device 520. In some implementations, the processing apparatus 510 is a processor with random access memory for temporarily storing instructions read from the data storage device 520 while the instructions are being executed. The processing apparatus 510 may include single or multiple processors, each having single or multiple processing cores. Alternatively, the processing apparatus 510 may include another type of device, or multiple devices, capable of manipulating or processing data. For example, the data storage device 520 may be a non-volatile information storage device such as a hard drive, a solid-state drive, a read-only memory device (ROM), an optical disc, a magnetic disc, or any other suitable type of storage device such as a non-transitory computer-readable memory. The data storage device 520 may include another type of device, or multiple devices, capable of storing data for retrieval or processing by the processing apparatus 510. The processing apparatus 510 may access and manipulate data stored in the data storage device 520 via the interconnect 570. For example, the data storage device 520 may store instructions executable by the processing apparatus 510 that upon execution by the processing apparatus 510 cause the processing apparatus 510 to perform operations (e.g., operations that implement the process 600 of FIG. 6).

The network interface 530 facilitates communication with other devices, for example, the mobile computing device 300 or the head-mounted display 410. For example, the network interface 530 may facilitate communication via a communications network. For example, the network interface 530 may facilitate communication via a Wi-Fi network, a cellular network, and/or a wired network. For example, the network interface 530 may facilitate communication via a WiMAX network. For example, the network interface 530 may facilitate communication via a fiber optic network.

In the example of FIG. 5, the cloud server 500 includes a user interface 540. For example, the user interface 540 may include a touchscreen display. For example, the user interface 540 may include a keyboard, a mouse, a joystick, and/or another handheld controller. For example, the user interface 540 may include a microphone configured to receive speech commands. For example, the user interface 540 may include an image sensor configured to detect hand gesture commands. For example, the user interface 540 may enable a user (e.g., a system administrator) to enter commands to the cloud server 500 to configure and/or maintain a collection of mixed reality recordings.

The processing apparatus 510 may be configured to enable gaze-driven signal processing to facilitate mixed reality or virtual reality applications, such as mixed reality recording. For example, the processing apparatus 510 may be configured to access gaze data (e.g., a sequence of gaze points for a user detected while the user was viewing and/or capturing a video associated with a mixed reality application). For example, the processing apparatus 510 may be configured to apply a temporal filter to the gaze data to obtain a smoothed gaze estimate, and determine a region of interest based on the smoothed gaze estimate. For example, the region of interest may identify a subset of a field of view. For example, the processing apparatus 510 may be configured to access a frame of video (e.g., a frame of video that has been displayed to a user while the gaze data for that user was collected), and apply signal processing to the frame of video based on the region of interest to obtain an enhanced frame of video. For example, the processing apparatus 510 may be configured to record a portion of the frame associated with the region of interest as the enhanced frame of video. For example, the portion of the frame may correspond to a smaller field of view than the frame. For example, the processing apparatus 510 may be configured to encode the frame using a first bit per pixel allocation for a first portion of the frame associated with the region of interest, and using one or more bit per pixel allocations that are lower than the first bit per pixel allocation for one or more respective portions of the frame outside of the first portion of the frame. For example, the processing apparatus 510 may be configured to apply computer vision processing to a portion of the frame associated with the region of interest to detect an object appearing in the portion of the frame and determine a classification of the object. For example, the portion of the frame may correspond to a smaller field of view than the frame. For example, the processing apparatus 510 may be configured to generate an annotation based on the classification, and superimpose the annotation on the frame of video to obtain the enhanced frame of video. In some implementations, the temporal filter includes a Kalman filter. In some implementations, the temporal filter includes a moving average of the gaze data in a window of time. For example, the processing apparatus 510 may be configured to apply the temporal filter to the gaze data to obtain the smoothed gaze estimate by fitting a curve to the gaze data in a window of time. For example, the processing apparatus 510 may be configured to determine the region of interest based on the smoothed gaze estimate by applying computer vision processing to the frame of video to detect and classify an object appearing in the frame of video to obtain a location within the frame of video associated with the object; determining values of a cost function for the region of interest based on the smoothed gaze estimate and the location of the object; and determining the region of interest based on the values of the cost function.

Figure 6:
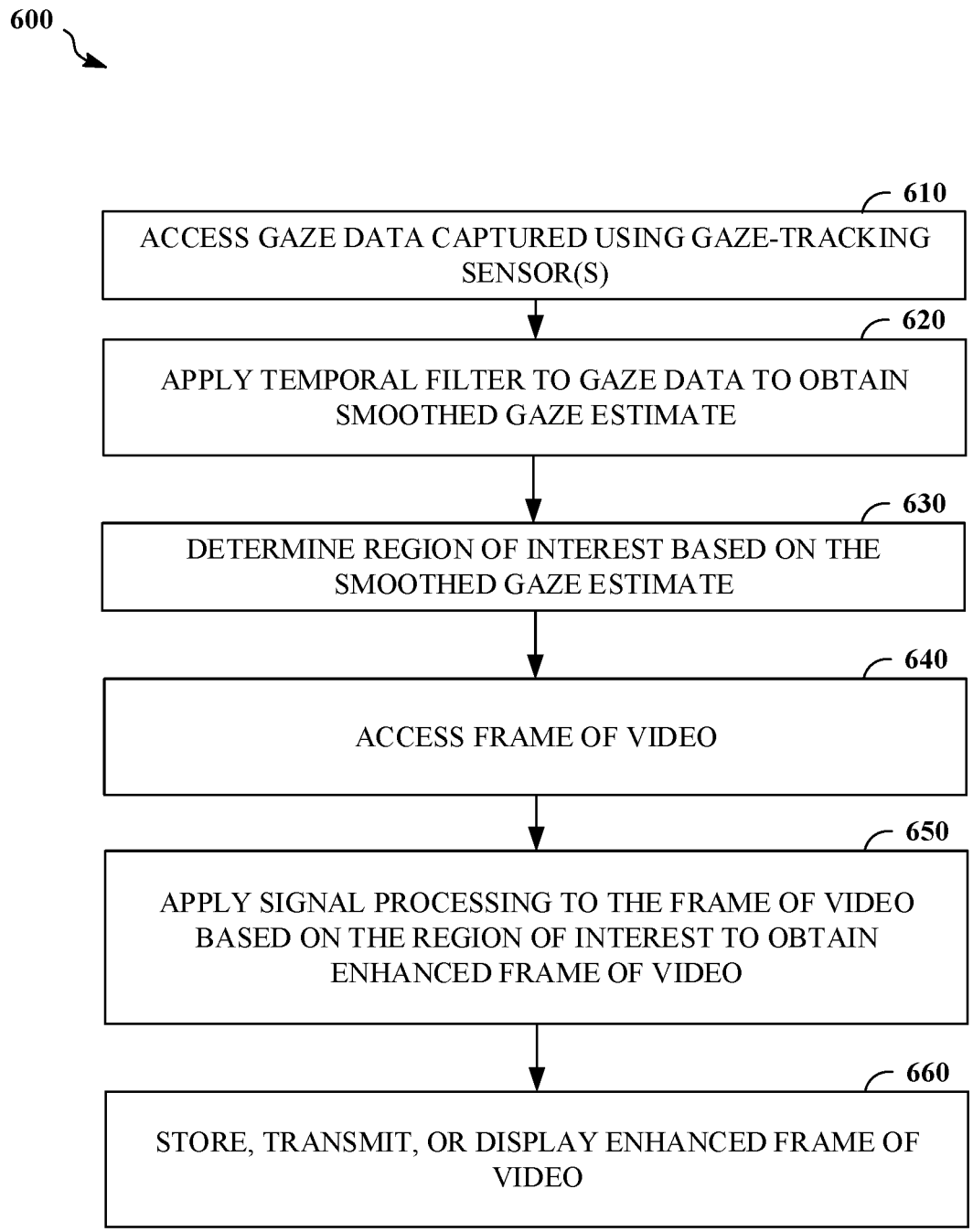
FIG. 6 is a flowchart of an example of a process for gaze-driven processing of video.

FIG. 6 is a flowchart of an example of a process 600 for gaze-driven processing of video. The process 600 includes accessing 610 gaze data captured using one or more gaze-tracking sensors; applying 620 a temporal filter to the gaze data to obtain a smoothed gaze estimate; determining 630 a region of interest based on the smoothed gaze estimate, wherein the region of interest identifies a subset of a field of view; accessing 640 a frame of video; applying 650 signal processing to the frame of video based on the region of interest to obtain an enhanced frame of video; and storing, transmitting, or displaying 660 the enhanced frame of video. For example, the process 600 may be implemented by the mobile computing device 300 of FIG. 3. For example, the process 600 may be implemented by the system 400 of FIG. 4. For example, the process 600 may be implemented by the cloud server 500 of FIG. 5.

The process 600 includes accessing 610 gaze data captured using one or more gaze-tracking sensors (e.g., the one or more gaze-tracking sensors 330 or the one or more gaze-tracking sensors 412). For example, the one or more gaze-tracking sensors may include one or more image sensors, which may detect light in various spectra (e.g., an infrared spectrum or a visible spectrum), and/or light sources (e.g., an infrared light source that is shined at the eyes of the user). For example, the one or more gaze-tracking sensors may also include hardware and/or software (e.g., gaze-tracking software) for processing raw image data to generate gaze data. For example, the gaze data may include a sequence of gaze points that each specify a direction (e.g., a ray, a rotation matrix, or a quaternion) or focal point (e.g., as coordinates in a three-dimensional space or a two-dimensional image space) of a gaze of an observed user at a given time. In some implementations, the gaze points in a sequence are synchronized to frames of an associated video. In some implementations, the gaze points in a sequence are asynchronous with frames of an associated video, and gaze points at times corresponding to respective frames of video may be interpolated from nearby gaze points from the sequence (e.g., using a resampling process). In some implementations, the one or more gaze-tracking sensors are coupled (e.g., attached) to a display device (e.g., a head-mounted display, a tablet, or a smartphone). For example, the one or more gaze-tracking sensors may be mounted on a fastening article (e.g., eyeglass frames or goggles) of a head-mounted display in such a way as to be directed at the eyes of a user wearing the head-mounted display. In some implementations, a user's gaze direction in the coordinates of an attached image sensor or display may be determined based on gaze data from the one or more gaze-tracking sensors. The gaze data may be accessed 610 in variety of ways. For example, the gaze data may be accessed 610 by reading directly from a sensor or from a memory via an interconnect (e.g., the interconnect 370). For example, the gaze data may be accessed 610 by receiving gaze data via a communications link (e.g., the wireless communications link 425).

The process 600 includes applying 620 a temporal filter to the gaze data to obtain a smoothed gaze estimate. For example, the temporal filter may be applied 620 to the gaze data to reduce jitter in the region of interest that will be determined 630 based on the gaze data. In some implementations, the temporal filter may be a finite impulse response filter that is applied to a sliding window (e.g., a window of duration of 1 second or 0.5 seconds) of gaze points in the gaze data. In some implementations, the duration of the window of gaze data may be tuned to reduce jitter. For example, applying the temporal filter to the gaze data to obtain the smoothed gaze estimate may include fitting a curve to the gaze data in a window of time. Other types of smoothing filters may be applied 620 to the gaze data. For example, the temporal filter may include a moving average of the gaze data in a window of time. For example, the temporal filter may include a Kalman filter. In some implementations, a Kalman filter may be applied 620 to predict a gaze direction at a future time.

The process 600 includes determining 630 a region of interest based on the smoothed gaze estimate. The region of interest identifies a subset of a field of view (e.g., a field of view of an array of one or more image sensors or a field of view of a video shown on a display). Once determined 630, the region of interest may be used to focus computational resources (e.g., memory, communication channel bandwidth, and/or processor cycles) on a portion of video data corresponding to the region of interest, in preference to other portions of an available field of view. For example, determining 630 the region of interest may include transforming the smoothed gaze estimate into a coordinate system of one or more image sensors and/or a display. For example, determining 630 the region of interest may include detecting and enforcing a boundary condition at an edge of an available field of view so that the region of interest does not move outside of the available field of view and maintains a consistent size relative to the available field of view. In some implementations, the region of interest is determined 630 as an area (e.g., a subset of the pixels) within a frame of video data.

The process 600 includes accessing 640 a frame of video. The frame of video may be captured using one or more image sensors (e.g., the one or more image sensors 340 or the one or more image sensors 414). In some implementations, the frame of video may depict a region of space in a vicinity of a user wearing a head-mounted display (e.g., the head-mounted display 410) that includes the one or more image sensors. The frame of video may have been captured while the user was observed using the one or more gaze-tracking sensors to generate the gaze data. In some implementations, the one or more image sensors are coupled (e.g., attached) to the one or more gaze-tracking sensors (e.g., as parts of a head-mounted display). In some implementations, the frame of video may depict one or more virtual objects of a virtual environment as part of a mixed reality or virtual reality application. For example, the frame of video may be a view of a virtual environment that was rendered based on head orientation data (e.g., from an inertial measurement unit) for the user and presented to the user in a head-mounted display (e.g., VR goggles). The frame of video may have been displayed (e.g., using a head-mounted display or a touchscreen display) to a user while the user was observed using the one or more gaze-tracking sensors to generate the gaze data. In some implementations, the display is coupled (e.g., attached) to the one or more gaze-tracking sensors (e.g., as parts of a head-mounted display or as parts of a smartphone or tablet). For example, a frame of video may be accessed 640 by reading directly from an image sensor, by reading the image from memory or another storage device (e.g., via the interconnect 370), or by receiving the frame of video via a communications link (e.g., the wireless communications link 425 or via the network interface 530) with another device.

The process 600 includes applying 650 signal processing to the frame of video based on the region of interest to obtain an enhanced frame of video. For example, applying 650 signal processing to the frame of video based on the region of interest to obtain the enhanced frame of video may include recording a portion of the frame associated with the region of interest as the enhanced frame of video. The portion of the frame corresponds to a smaller field of view than the frame. For example, applying 650 signal processing to the frame of video based on the region of interest to obtain the enhanced frame of video may include encoding a portion of the frame associated with the region of interest with a higher bit per pixel allocation relative to other portions of the frame. For example, the frame may be encoded using a first bit per pixel allocation for a first portion of the frame associated with the region of interest, and using one or more bit per pixel allocations that are lower than the first bit per pixel allocation for one or more respective portions of the frame outside of the first portion of the frame. For example, applying 650 signal processing to the frame of video based on the region of interest to obtain the enhanced frame of video may include applying computer vision processing to a portion of the frame associated with the region of interest and augmenting or modifying the frame of video (e.g., adding metadata to a data structure including the frame of video or overlaying an annotation in the frame of video) based on the detection and/or classification of an object appearing in the region of interest. For example, the process 700 of FIG. 7 may be implemented to apply 650 signal processing to the frame of video based on the region of interest to obtain the enhanced frame of video. In some implementations, computer vision processing is applied 650 to portions of frames associated with the respective regions of interest in a sequence of frames of a video to search the video for times when a classified object appeared in the current region of interest (e.g., when the user may have seen these objects of interest).

The process 600 includes storing, transmitting, or displaying 660 the enhanced frame of video. For example, the enhanced frame of video may be stored in a memory or other data storage device (e.g., the data storage device 320, the data storage device 470, or the data storage device 520). For example, the enhanced frame of video may be transmitted to another device via a communications interface (e.g., the network interface 360, the network interface 492, or the network interface 530). For example, the enhanced frame of video may be displayed with a screen, a projector, or some other type of display (e.g., the display 350, the display 422, or the user interface 540).

FIG. 7 is a flowchart of an example of a process 700 for annotating an image based on an object in a gaze-driven region of interest. The process 700 includes applying 710 computer vision processing to a portion of the frame associated with the region of interest to detect an object appearing in the portion of the frame and determine a classification of the object; generating 720 an annotation based on the classification; and superimposing 730 the annotation on the frame of video to obtain the enhanced frame of video. For example, the process 700 may be implemented by the mobile computing device 300 of FIG. 3. For example, the process 700 may be implemented by the system 400 of FIG. 4. For example, the process 700 may be implemented by the cloud server 500 of FIG. 5.

The process 700 includes applying 710 computer vision processing to a portion of the frame associated with the region of interest to detect an object appearing in the portion of the frame and determine a classification of the object. The portion of the frame corresponds to a smaller field of view than the frame. For example, applying 710 computer vision processing to a portion of the frame associated with the region of interest may include inputting pixel values from the portion to a convolutional neural network that has been trained to detect and classify objects appearing in an image the size of the portion. The convolutional neural network may output a classification of a detected object. In some implementations, one or more transforms (e.g., a Fourier transform or a wavelet transform) may be applied to the portion of the frame, and the resulting transform coefficients may be input to a neural network. For example, the classification may include a vector of class probabilities.

The process 700 includes generating 720 an annotation based on the classification. For example, the annotation may include text or another symbol associated with a class recognized by the computer vision system that was used to determine the classification. For example, the annotation may be a class label for the class of an object detected in the portion of the frame associated with the region of interest. For example, the annotation may correspond to the class with the largest probability value in the classification, where the classification is a vector of class probabilities.

The process 700 includes superimposing 730 the annotation on the frame of video to obtain the enhanced frame of video. For example, text of the annotation may be superimposed 730 over the frame of video by replacing some of the pixel values of the frame of video with a color in a pattern that writes the text on the image. In some implementations, the annotation may be semi-transparent, and the annotation may be superimposed 730 by adding offsets to pixel values of the frame of video in a pattern forming the annotation.

Figure 8:
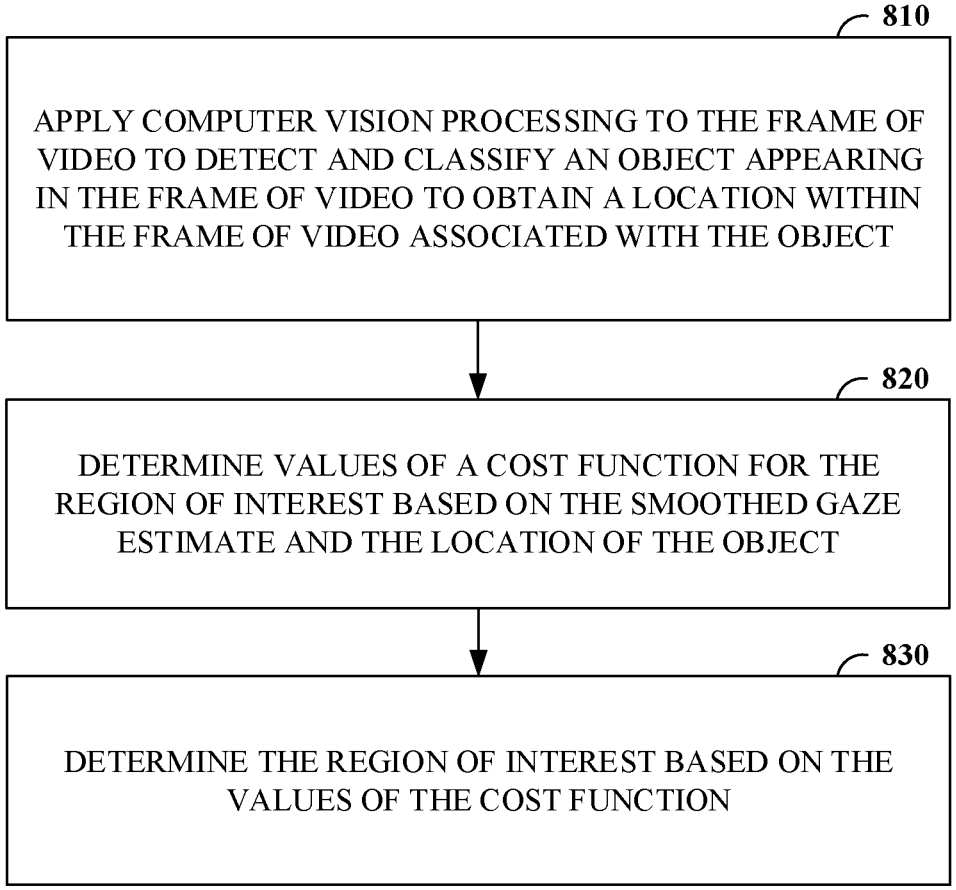
FIG. 8 is a flowchart of an example of a process for determining a region of interest based on a combination of gaze data and saliency information based on recognized objects.

FIG. 8 is a flowchart of an example of a process 800 for determining a region of interest based on a combination of gaze data and saliency information based on recognized objects. The process 800 includes applying 810 computer vision processing to the frame of video to detect and classify an object appearing in the frame of video to obtain a location within the frame of video associated with the object; determining 820 values of a cost function for the region of interest based on the smoothed gaze estimate and the location of the object; and determining 830 the region of interest based on the values of the cost function. For example, the process 800 may be implemented by the mobile computing device 300 of FIG. 3. For example, the process 800 may be implemented by the system 400 of FIG. 4. For example, the process 800 may be implemented by the cloud server 500 of FIG. 5.

The process 800 includes applying 810 computer vision processing to the frame of video to detect and classify an object appearing in the frame of video to obtain a location within the frame of video associated with the object. For example, applying 810 computer vision processing to the frame of video may include inputting pixel values from the frame to a convolutional neural network that has been trained to detect and classify objects appearing in an image the size of the frame. The convolutional neural network may output a classification of a detected object. In some implementations, one or more transforms (e.g., a Fourier transform or a wavelet transform) may be applied to the frame, and the resulting transform coefficients may be input to a neural network. For example, the classification may include a vector of class probabilities. The convolutional neural network may output an indication of the location of a detected object within the frame of video. For example, a block index associated with a block of pixels within the frame in which the object has been detected may be output by a convolutional neural network. In some implementations, overlapping blocks at multiple scales and locations are processed by a neural network to detect and/or classify an object. For example, the location may be a pair of pixel offsets associated with a block (e.g., at the center of the block) within which an object has been detected.

The process 800 includes determining 820 values of a cost function for the region of interest based on the smoothed gaze estimate and the location of the object. The cost function may serve to combine multiple objectives in determining the region of interest. For example, the cost function may include a term based on a distance between a gaze estimate (e.g., the smoothed gaze estimate) and a point (e.g., a center point) within a candidate region of interest. For example, the cost function may include a term based on a distance between the location of the object (e.g., the center of the block in which the object was detected) and a point (e.g., a center point) within a candidate region of interest. For example, the cost function may include a linear combination of a term based on a distance between the gaze estimate and the region of interest, and a term based on a distance between the location of the object and the region of interest.

The process 800 includes determining 830 the region of interest based on the values of the cost function. For example, the region of interest may be determined 830 by selecting a candidate region of interest with the smallest associated value of the cost function.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Entities implementing the above-described techniques for recording CGR environments are reminded to comply with established industry or governmental privacy requirements. For example, it is suggested that entities providing CGR recording features begin recording responsive to a user's specific instruction to do so, and to identify the destination of such recordings to the user. It is also suggested that these entities take steps to remind users that when recordings are transmitted beyond their local device (e.g., uploaded to a social media website, so forth), they may be subject to processing and/or viewing by internet users and/or internet entities. It cannot be ruled out that, if a malicious entity obtain a CGR recordings, that such an entity may attempt to reverse engineer where a user was gazing during a particular CGR session. However, it is noted that metadata indicating such information need not be saved in order to implement the above-described techniques. Also, implementations may further obfuscate a user's exact gaze, for example, by changing the temporal filters that are applied from time to time. Importantly, personally identifiable information data, if any, should be handled so as to minimize the risks of unauthorized and/or unintentional access and/or use. The nature of any authorized use should also be clearly indicated to users.

As described above, one aspect of the present technology is the gathering and use of data available from various sources to improve a computer-generated reality experience. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better identify objects of interest to a user within a field of view. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, objects of interest can be identified based on non-personal information data or a bare minimum amount of personal information, such as the content being requested by the device associated with a user, other non-personal information available to the computer-generated reality system, or publicly available information.

What is claimed is:

1. A system comprising:
   one or more gaze-tracking sensors;
   one or more image sensors; and
   a processing apparatus configured to:
   access gaze data captured using the one or more gaze-tracking sensors;
   apply a temporal filter to the gaze data to obtain a smoothed gaze estimate;
   determine a region of interest based on the smoothed gaze estimate, wherein the region of interest identifies a subset of a field of view of the one or more image sensors;
   access a frame of video captured using the one or more image sensors, and wherein the processing apparatus is configured to determine the region of interest based on the smoothed gaze estimate by performing operations comprising applying computer vision processing to the frame of video to detect and classify an object appearing in the frame of video to obtain a location within the frame of video associated with the object, determining values of a cost function for the region of interest based on the smoothed gaze estimate and the location of the object, and determining the region of interest based on the values of the cost function; and apply signal processing to the frame of video based on the region of interest to obtain an enhanced frame of video.

2. The system of claim 1, wherein the processing apparatus is configured to apply signal processing to the frame of video based on the region of interest to obtain the enhanced frame of video by performing operations comprising:

recording a portion of the frame associated with the region of interest as the enhanced frame of video, wherein the portion of the frame corresponds to a smaller field of view than the frame.

3. The system of claim 1, wherein the processing apparatus is configured to apply signal processing to the frame of video based on the region of interest to obtain the enhanced frame of video by performing operations comprising:

encoding the frame using a first bit-per-pixel allocation for a first portion of the frame associated with the region of interest, and using one or more bit-per-pixel allocations that are lower than the first bit-per-pixel allocation for one or more respective portions of the frame outside of the first portion of the frame.

4. The system of claim 1, wherein the processing apparatus is configured to apply signal processing to the frame of video based on the region of interest to obtain the enhanced frame of video by performing operations comprising:

applying computer vision processing to a portion of the frame associated with the region of interest to detect an object appearing in the portion of the frame and determine a classification of the object, wherein the portion of the frame corresponds to a smaller field of view than the frame;

generating an annotation based on the classification; and superimposing the annotation on the frame of video to obtain the enhanced frame of video.

5. The system of claim 1, comprising:

a head-mounted display attached to the one or more gaze-tracking sensors and the one or more image sensors, wherein the head-mounted display is configured to display the enhanced frame of video.

6. The system of claim 1, wherein the temporal filter includes a Kalman filter.

7. The system of claim 1, wherein the temporal filter includes a moving average of the gaze data in a window of time.

8. The system of claim 1, wherein the processing apparatus is configured to apply the temporal filter to the gaze data to obtain the smoothed gaze estimate by performing operations comprising:

fitting a curve to the gaze data in a window of time.

9. A method comprising:

accessing gaze data captured using one or more gaze-tracking sensors;

applying a temporal filter to the gaze data to obtain a smoothed gaze estimate;

determining a region of interest based on the smoothed gaze estimate, wherein the region of interest identifies a subset of a field of view;

accessing a frame of video, and wherein determining the region of interest based on the smoothed gaze estimate comprises applying computer vision processing to the frame of video to detect and classify an object appearing in the frame of video to obtain a location within the frame of video associated with the object, determining values of a cost function for the region of interest based on the smoothed gaze estimate and the location of the object, and determining the region of interest based on the values of the cost function;

applying signal processing to the frame of video based on the region of interest to obtain an enhanced frame of video; and storing, transmitting, or displaying the enhanced frame of video.

10. The method of claim 9, wherein applying signal processing to the frame of video based on the region of interest to obtain the enhanced frame of video comprises:

recording a portion of the frame associated with the region of interest as the enhanced frame of video, wherein the portion of the frame corresponds to a smaller field of view than the frame.

11. The method of claim 9, wherein applying signal processing to the frame of video based on the region of interest to obtain the enhanced frame of video comprises:

encoding the frame using a first bit-per-pixel allocation for a first portion of the frame associated with the region of interest, and using one or more bit-per-pixel allocations that are lower than the first bit-per-pixel allocation for one or more respective portions of the frame outside of the first portion of the frame.

12. The method of claim 9, wherein applying signal processing to the frame of video based on the region of interest to obtain the enhanced frame of video comprises:

applying computer vision processing to a portion of the frame associated with the region of interest to detect an object appearing in the portion of the frame and determine a classification of the object, wherein the portion of the frame corresponds to a smaller field of view than the frame;

generating an annotation based on the classification; and superimposing the annotation on the frame of video to obtain the enhanced frame of video.

13. The method of claim 9, wherein applying the temporal filter to the gaze data to obtain the smoothed gaze estimate comprises:

fitting a curve to the gaze data in a window of time.

14. A non-transitory computer-readable storage medium comprising executable instructions that, when executed by a processor, cause performance of operations comprising:

accessing gaze data captured using one or more gaze-tracking sensors;

applying a temporal filter to the gaze data to obtain a smoothed gaze estimate;

determining a region of interest based on the smoothed gaze estimate, wherein the region of interest identifies a subset of a field of view;

accessing a frame of video;

applying signal processing to the frame of video based on the region of interest to obtain an enhanced frame of video, wherein the executable instructions for applying signal processing to the frame of video based on the region of interest to obtain the enhanced frame of video include executable instructions that, when executed by a processor, cause performance of operations comprising applying computer vision processing to a portion of the frame associated with the region of interest to detect an object appearing in the portion of the frame and determine a classification of the object, wherein the portion of the frame corresponds to a smaller field of view than the frame, generating an annotation based on the classification; and superimposing the annotation on the frame of video to obtain the enhanced frame of video; and storing, transmitting, or displaying the enhanced frame of video.

15. The non-transitory computer-readable storage medium of claim 14, wherein the executable instructions for applying signal processing to the frame of video based on the region of interest to obtain the enhanced frame of video include executable instructions that, when executed by a processor, cause performance of operations comprising:

recording a portion of the frame associated with the region of interest as the enhanced frame of video, wherein the portion of the frame corresponds to a smaller field of view than the frame.

16. The non-transitory computer-readable storage medium of claim 14, wherein the executable instructions for applying signal processing to the frame of video based on the region of interest to obtain the enhanced frame of video include executable instructions that, when executed by a processor, cause performance of operations comprising:

encoding the frame using a first bit-per-pixel allocation for a first portion of the frame associated with the region of interest, and using one or more bit-per-pixel allocations that are lower than the first bit-per-pixel allocation for one or more respective portions of the frame outside of the first portion of the frame.

17. The non-transitory computer-readable storage medium of claim 14, wherein the executable instructions for determining the region of interest based on the smoothed gaze estimate include executable instructions that, when executed by a processor, cause performance of operations comprising:

applying computer vision processing to the frame of video to detect and classify an object appearing in the frame of video to obtain a location within the frame of video associated with the object;

determining values of a cost function for the region of interest based on the smoothed gaze estimate and the location of the object; and determining the region of interest based on the values of the cost function.

18. The non-transitory computer-readable storage medium of claim 14, wherein the temporal filter includes a Kalman filter.

19. The non-transitory computer-readable storage medium of claim 14, wherein the temporal filter includes a moving average of the gaze data in a window of time.

20. The non-transitory computer-readable storage medium of claim 14, wherein the executable instructions for applying the temporal filter to the gaze data to obtain the smoothed gaze estimate include executable instructions that, when executed by a processor, cause performance of operations comprising:

fitting a curve to the gaze data in a window of time.

* * * * *